United States Patent
Watanabe et al.

(10) Patent No.: US 9,822,702 B2
(45) Date of Patent: Nov. 21, 2017

(54) CARBON SCRAPER

(71) Applicant: Cummins, Inc., Columbus, IN (US)

(72) Inventors: Atsuhiko Watanabe, London (GB);
Andrew G. Kitchen, Newnham (GB);
Philipe Saad, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 15/113,726

(22) PCT Filed: Feb. 11, 2015

(86) PCT No.: PCT/US2015/015390
§ 371 (c)(1),
(2) Date: Jul. 22, 2016

(87) PCT Pub. No.: WO2015/134162
PCT Pub. Date: Sep. 11, 2015

(65) Prior Publication Data
US 2017/0002734 A1    Jan. 5, 2017

Related U.S. Application Data

(60) Provisional application No. 61/947,273, filed on Mar. 3, 2014.

(51) Int. Cl.
F02B 77/02 (2006.01)
F02B 77/04 (2006.01)
F16J 10/04 (2006.01)
F02F 1/00 (2006.01)

(52) U.S. Cl.
CPC .............. F02B 77/04 (2013.01); F02F 1/004 (2013.01); F16J 10/04 (2013.01)

(58) Field of Classification Search
CPC . F02B 77/04; F02B 77/02; F02F 1/004; F02F 2001/006; F16J 10/04
USPC ...................................... 123/668, 669, 193.2
See application file for complete search history.

(56) References Cited

U.S. PATENT DOCUMENTS

| | | | |
|---|---|---|---|
| 4,474,147 A | 10/1984 | Hoopes | |
| 4,735,128 A | 4/1988 | Mahrus et al. | |
| 5,553,585 A * | 9/1996 | Paro | F16J 10/04 123/193.2 |
| 5,660,399 A | 8/1997 | Atmur et al. | |
| 6,164,260 A | 12/2000 | Bock | |
| 7,438,039 B2 * | 10/2008 | Poola | F02B 23/0672 123/193.6 |
| 2005/0279296 A1 | 12/2005 | Coney et al. | |

(Continued)

OTHER PUBLICATIONS

The International Search Report and Written Opinion of the International Searching Authority issued in PCT/US2015/015390, dated May 15, 2015.

*Primary Examiner* — Hai Huynh
(74) *Attorney, Agent, or Firm* — Foley & Lardner LLP

(57) ABSTRACT

A carbon scraper, a method of manufacturing a system with a carbon scraper, and method of scraping carbon from a piston of an internal combustion engine are provided. The carbon escaper includes an outer annular metallic shell portion having an annular recess therein. The annular scraper also includes an inlaid thermal barrier coating portion positioned within the annular recess of the outer annular metallic shell portion such that the inlaid thermal barrier coating portion is concentric with an outer annular metallic shell portion.

30 Claims, 1 Drawing Sheet

(56) References Cited

U.S. PATENT DOCUMENTS

2013/0139780 A1    6/2013  Imhasly
2015/0114373 A1*   4/2015  Beasley .................... F02F 1/00
                                                        123/668

* cited by examiner

CARBON SCRAPER

CROSS REFERENCE TO RELATED APPLICATIONS

The present application is a U.S. National Stage of PCT Patent Application No. PCT/US2015/015390, filed Feb. 11, 2015, which claims the benefit of priority from U.S. Provisional Patent Application Ser. No. 61/947,273, filed on Mar. 3, 2014, the disclosures of which are hereby incorporated by reference in its their entirety for all purposes.

TECHNICAL FIELD

This disclosure relates to a system for scraping carbon from a piston of an internal combustion engine.

BACKGROUND

Carbon scraper rings, also referred to as anti-polishing rings, may be positioned within an engine to scrape down carbon deposits that accumulate on the side of the top of the piston, for example above the top piston ring, when the piston moves up into the top dead center position. The removal of such carbon deposits helps prevent the formation of hard deposits on the piston that can damage the engine as the piston moves up and down.

SUMMARY

Various embodiments provide systems and methods for scraping carbon from a piston of an internal combustion engine. In particular embodiments, an engine assembly is provided that includes a cylinder block having a cylinder bore disposed therein. The cylinder bore is configured to house a piston. The engine assembly further includes an annular scraper disposed within the cylinder bore. The annular scraper is positioned concentrically in the cylinder bore. The annular scraper includes an outer annular metallic shell portion and an inlaid thermal barrier coating portion. The inlaid thermal barrier coating portion is positioned in an annular recess in the outer annular metallic shell portion. The inlaid thermal barrier coating portion is concentric with the outer annular metallic shell portion.

In particular embodiments, at least one radially inner and axially outer edge of the annular scraper includes the outer annular metallic shell portion. In particular embodiments, the inlaid thermal barrier coating portion of the annular scraper is positioned between a first edge and a second edge of the annular scraper, where the first edge and the second edge including the annular metallic shell portion and where the first edge and the second edge each disposed at a radially inner and axially outer position. The outer annular metallic shell portion of the annular scraper includes steel, in accordance with particular embodiments. The inlaid thermal barrier coating portion includes a material having a lower thermal conductivity than the outer annular metallic shell portion, in particular embodiments. In particular embodiments, the inlaid thermal barrier coating portion includes a non-metallic material having a lower thermal conductivity than the metallic scraper. The inlaid thermal barrier coating portion may comprise a ceramic material. An inner diameter of the inlaid thermal barrier coating portion may be substantially the same as an inner diameter of the outer annular metallic shell portion. In particular embodiments, the engine assembly also includes a cylinder liner disposed in the cylinder bore. The annular scraper is positioned within a recess in the cylinder liner, in particular embodiments. The engine assembly may also have a piston disposed within the cylinder bore and within the cylinder liner. In particular embodiments, the annular scraper is positioned within the cylinder bore between a cylinder head and the piston, the cylinder head configured to house an intake port, an intake valve, an exhaust port, and an exhaust valve.

Other various embodiments provide a method of manufacturing an engine assembly. The method includes forming a cylinder block having a cylinder bore disposed therein. The cylinder bore is configured to house a piston. The method further includes positioning an annular scraper in the cylinder bore such that the annular scraper is concentric with the cylinder bore. The annular scraper includes an outer annular metallic shell portion and an inlaid thermal barrier coating portion. The inlaid thermal barrier coating portion is positioned within an annular recess in the outer annular metallic shell portion. The inlaid thermal barrier coating portion is concentric with the outer annular metallic shell portion.

In particular embodiments, the method also includes positioning the inlaid thermal barrier coating portion within the annular recess in the outer annular metallic shell portion such that at least one radially inner and axially outer edge of the annular scraper includes the outer annular metallic shell portion. The inlaid thermal barrier coating portion may be positioned within the annular recess in the outer annular metallic shell portion such that the inlaid thermal barrier coating portion is positioned between a first edge and a second edge of the annular scraper, where the first edge and the second edge including the annular metallic shell portion and where the first edge and the second edge each disposed at a radially inner and axially outer position. The method may also include positioning a cylinder liner in the cylinder bore. The annular scraper may be positioned within a recess in the cylinder liner. The inlaid thermal barrier coating portion may a ceramic material. In particular embodiments, the inlaid thermal barrier coating portion includes a material having a lower thermal conductivity than the outer annular metallic shell portion.

In various embodiments, an annular scraper for cleaning a portion of a piston in an engine assembly is provided. The annular scraper includes an outer annular metallic shell portion having an annular recess therein. The annular scraper also includes an inlaid thermal barrier coating portion positioned within the annular recess of the outer annular metallic shell portion such that the inlaid thermal barrier coating portion is concentric with an outer annular metallic shell portion.

In particular embodiments, at least one radially inner and axially outer edge of the annular scraper includes the outer annular metallic shell portion. The inlaid thermal barrier coating portion of the annular scraper may positioned between a first edge and a second edge of the annular scraper, where the first edge and the second edge including the annular metallic shell portion and where the first edge and the second edge each disposed at a radially inner and axially outer position. The inlaid thermal barrier coating portion may include a material having a lower thermal conductivity than the outer annular metallic shell portion. The inlaid thermal barrier coating portion may a ceramic material. An inner diameter of the inlaid thermal barrier coating portion may be substantially the same as an inner diameter of the outer annular metallic shell portion.

Other particular embodiments provide an engine assembly that includes a cylinder block having a cylinder bore disposed therein. The cylinder bore is configured to house a piston. The engine assembly further includes an annular scraper disposed within the cylinder bore. The annular scraper is positioned concentrically in the cylinder bore. The annular scraper includes an outer annular metallic shell portion and a thermal barrier coating portion, concentric with the outer annular metallic shell portion.

In particular embodiments, at least one radially inner and axially outer edge of the annular scraper includes the outer annular metallic shell portion. The outer annular metallic shell portion of the annular scraper may include steel. The thermal barrier coating portion may include a material having a lower thermal conductivity than the outer annular metallic shell portion, in accordance with particular embodiments. The thermal barrier coating portion may include a ceramic material.

The inventors have appreciated that engine performance may be enhanced by scraping carbon from a piston in an internal combustion engine. The inventors have also appreciated that reducing heat transfer loss or increasing thermal efficiency at the interface of a carbon scraper ring improves the fuel efficiency of the engine and reduces unburnt hydrocarbon emissions. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive systems, and methods of scrapping carbon from a piston of an internal combustion engine. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
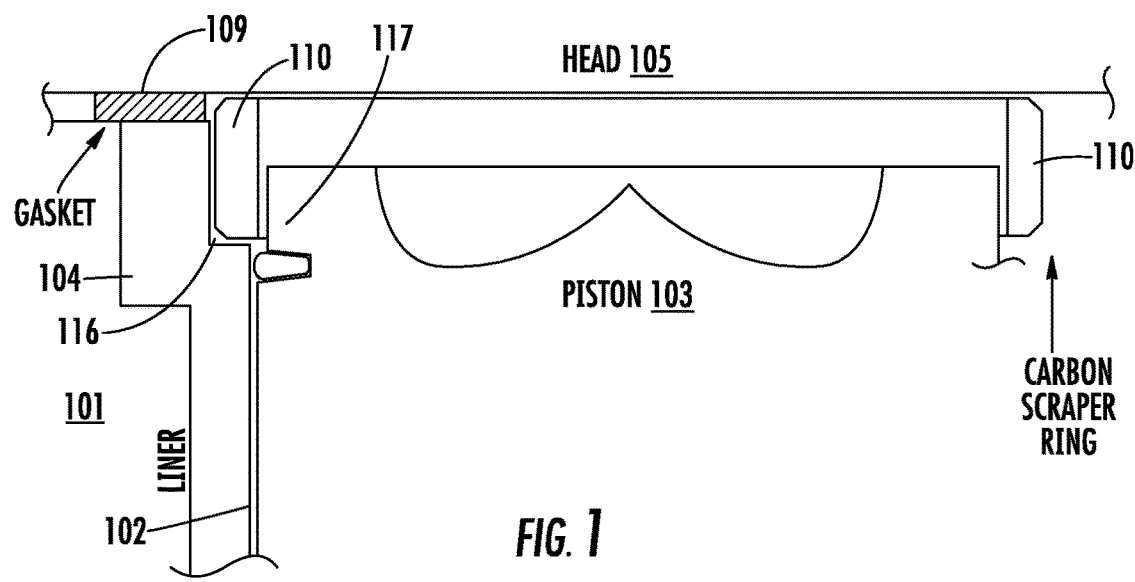
FIG. 1 is a sectional side view of an engine assembly including a carbon scraper in accordance with example embodiments.

FIG. 1 is a sectional side view of an engine assembly including a carbon scraper, in accordance with example embodiments. The engine assembly 100 includes a cylinder block 101 that includes at least one cylinder bore 102 disposed therein. The engine assembly 100 may comprise, for example a diesel engine or a natural gas engine. The cylinder block 101 may include a block having cylinder bores, which may be configured, for example, in a v-shaped configuration or an inline configuration. The cylinder bore 102 is a cylindrical opening that is configured to house a piston such as piston 103 shown in FIG. 1. The piston 103, in the illustrated embodiment, includes a piston ring 106 and valve recesses 107. The piston ring 106 is the top ring in the illustrated embodiment. The cylinder block 101 is capped with a cylinder head 105. The cylinder head 105 includes openings through which the intake valve and exhaust valve extend. The engine assembly 100 may also include a gasket 109 positioned between the cylinder head 105 and the cylinder block 101. The cylinder bore 102 may also include a cylinder liner 104 positioned concentrically about the piston 103 between the piston 103 and the cylinder block 101. As shown in FIG. 1, an annular scraper 110 is positioned in the cylinder bore 102 at the top of the bore, such that the annular scraper 110 surrounds at least a top portion of the piston 103 when the piston is moved to a top dead center position. In the illustrated embodiment, the annular scraper 110 is positioned in an annular recess 116 formed by the cylinder liner 104. The annular scraper 110 is concentric with the cylinder bore 102 and the piston 103. The annular scraper 110 may have an inner diameter that is smaller than the inner diameter of the cylinder liner 104.

Figure 2:
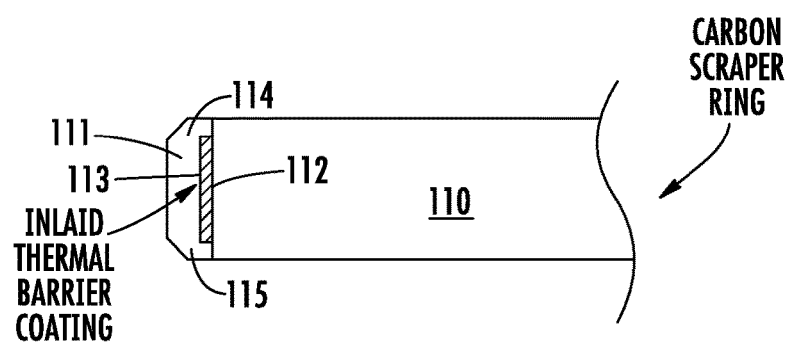
FIG. 2 illustrates a side sectional view of the carbon scraper of FIG. 1.

FIG. 2 illustrates a side sectional view of the carbon scraper of FIG. 1. As demonstrated in FIG. 2, the annular scraper 110 includes an outer annular metallic shell portion 111 and an inlaid thermal barrier coating portion 112 positioned within an annular recess 113 formed in the outer annular metallic shell portion 111 of the annular scraper 110. The inlaid thermal barrier coating portion 112 is coupled to and concentric with the outer annular metallic shell portion 111. The inlaid thermal barrier coating portion 112 is composed of a material having a lower thermal conductivity than the outer annular metallic shell portion 111. In particular embodiments, the inlaid thermal barrier coating portion 112 is composed of a ceramic material. In particular embodiments, the outer annular metallic shell portion 111 is composed of steel. The inlaid thermal barrier coating portion 112 may be positioned within the annular recess 113 such that the inlaid thermal barrier coating portion 112 is between an upper and radially inner edge 114 and a lower and radially inner edge 115. Each of the upper and radially inner edge 114 and the lower and radially inner edge 115 are on an axially outer edge or axially outer extremity of the annular scraper 110 with respect to an axis extending through the center of and concentric with the annular scraper 110 such that the annular scraper 110 encircles the axis. The upper and radially inner edge 114 and the lower and radially inner edge 115 comprise a portion of the outer annular metallic shell portion 111. Accordingly, when a piston landing 117 traverses the annular scraper 110, the exposed metal edge (e.g. the lower and radially inner edge 115, which is on one of the axially outer edges of the annular scraper) of the annular scraper 110 contacts carbon deposits disposed on the side of the piston landing 117 and scrapes down the carbon deposits, while preserving the inlaid thermal barrier coating portion 112 and limiting debonding of the inlaid thermal barrier coating portion 112. Removal of carbon deposits from the piston 103 prevents those deposits from scratching and damaging the cylinder liner 104 as the piston reciprocates up and down between the top dead center and bottom dead center positions.

The inlaid thermal barrier coating portion 112 acts as a thermal insulator that reduces the amount of heat that is transferred from hot combustion gases disposed between the piston landing 117 of the piston 103, the cylinder head 105 to the cylinder liner 104. The reduction in heat transfer from the hot combustion gases to the cylinder liner 104 reduces the temperature of the liner and improves the fuel efficiency of engine assembly 100. By reducing the temperature of the cylinder liner 104, an oil film on the cylinder liner 104 is more aptly retained on the liner at the reversal point of the piston ring 106, thereby permitting the piston ring 106 to be placed higher in relation to the piston, thereby reducing the top land crevice volume (i.e. the volume between the top land of the piston and the cylinder liner wall). The fuel air mixture in the top land crevice volume is usually the last part of the mixture to burn, particularly on a pre-mixed gas engine. Accordingly, the fuel air mixture in that volume may not be completely burned, thereby generating unburnt hydrocarbon emissions and reducing the engines brake thermal efficiency. As such, reducing the heat loss (via transfer to the cylinder liner wall) through the use of the thermal barrier coating helps keep the top land crevice volume warmer permitting more complete combustion. As demonstrated in the illustrated embodiment, the inlaid thermal barrier coating portion 112 and the upper and radially inner edge 114 and the lower and radially inner edge 115 may have substantially the same inner diameter. The annular scraper 110 is illustrated in a symmetric configuration which permits the annular scraper 110 to be installed in either direction, but the annular scraper 110 may be asymmetric in accordance with example embodiments. In example embodiments, a thermal barrier coating portion of the annular scraper 110 may be bonded to a non-recessed surface of the outer annular metallic shell portion 111. For example, the radially inner surface of the outer annular metallic shell may be linear or smooth, and a thermal barrier coating may be applied to a portion of the smooth surface. In such an embodiment, the lower and radially inner edge 115 of the outer annular metallic shell portion 111 may extend further radially inward than the thermal barrier coating and the upper and radially inner edge 114 of the outer annular metallic shell portion 111 may not extend as far radially inward as the lower radially inner edge 115 of the outer annular metallic shell portion 111.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An engine assembly, comprising:
   a cylinder block including a cylinder bore disposed therein, the cylinder bore configured to house a piston; and
   an annular scraper disposed within the cylinder bore, the annular scraper positioned concentrically in the cylinder bore, the annular scraper including an outer annular metallic shell portion and an inlaid thermal barrier coating portion, the inlaid thermal barrier coating portion positioned within an annular recess defined within an inner surface of the outer annular metallic shell portion, the inlaid thermal barrier coating portion concentric with the outer annular metallic shell portion.

2. The engine assembly of claim 1, wherein at least one radially inner and axially outer edge of the annular scraper includes the outer annular metallic shell portion.

3. The engine assembly of claim 1, wherein the inlaid thermal barrier coating portion of the annular scraper is positioned between a first edge and a second edge of the annular scraper, the first edge and the second edge including the annular metallic shell portion, the first edge and the second edge each disposed at a radially inner and axially outer position.

4. The engine assembly of claim 1, wherein the outer annular metallic shell portion of the annular scraper comprises steel.

5. The engine assembly of claim 1, wherein the inlaid thermal barrier coating portion comprises a material having a lower thermal conductivity than the outer annular metallic shell portion.

6. The engine assembly of claim 1, wherein the inlaid thermal barrier coating portion comprises a non-metallic material having a lower thermal conductivity than the metallic scraper.

7. The engine assembly of claim 1, wherein the inlaid thermal barrier coating portion comprises a ceramic material.

8. The engine assembly of claim 1, wherein an inner diameter of the inlaid thermal barrier coating portion is substantially the same as an inner diameter of the outer annular metallic shell portion.

9. The engine assembly of claim 1, further comprising a cylinder liner disposed in the cylinder bore.

10. The engine assembly of claim 9, wherein the annular scraper is positioned within a recess in the cylinder liner.

11. The engine assembly of claim 10, further comprising a piston disposed within the cylinder bore and within the cylinder liner.

12. The engine assembly of claim 11, wherein the annular scraper is positioned within the cylinder bore between a cylinder head and the piston, the cylinder head configured to house an intake port, an intake valve, an exhaust port, and an exhaust valve.

13. A method of manufacturing an engine assembly comprising, the method comprising:
   forming a cylinder block having a cylinder bore disposed therein, the cylinder bore configured to house a piston; and
   positioning an annular scraper in the cylinder bore such that the annular scraper is concentric with the cylinder bore, the annular scraper including an outer annular metallic shell portion and an inlaid thermal barrier coating portion, the inlaid thermal barrier coating portion positioned within an annular recess defined within an inner surface of the outer annular metallic shell portion, the inlaid thermal barrier coating portion concentric with the outer annular metallic shell portion.

14. The method according to claim 13, further comprising positioning the inlaid thermal barrier coating portion within the annular recess in the outer annular metallic shell portion such that at least one radially inner and axially outer edge of the annular scraper includes the outer annular metallic shell portion.

15. The method according to claim 13, further comprising positioning the inlaid thermal barrier coating portion within the annular recess in the outer annular metallic shell portion such that the inlaid thermal barrier coating portion is positioned between a first edge and a second edge of the annular scraper, the first edge and the second edge including the annular metallic shell portion, the first edge and the second edge each disposed at a radially inner and axially outer position.

16. The method according to claim 13, further comprising positioning a cylinder liner in the cylinder bore.

17. The method according to claim 16, wherein the annular scraper is positioned within a recess in the cylinder liner.

18. The method according to claim 13, wherein the inlaid thermal barrier coating portion comprises a ceramic material.

19. The method according to claim 13, wherein the inlaid thermal barrier coating portion comprises a material having a lower thermal conductivity than the outer annular metallic shell portion.

20. An annular scraper for cleaning a portion of a piston in an engine assembly, the annular scraper comprising:
  an outer annular metallic shell portion having an annular recess within an inner surface of the outer annular metallic shell portion; and
  an inlaid thermal barrier coating portion positioned within the annular recess of the outer annular metallic shell portion such that the inlaid thermal barrier coating portion is concentric with an outer annular metallic shell portion.

21. The annular scraper of claim 20, wherein at least one radially inner and axially outer edge of the annular scraper includes the outer annular metallic shell portion.

22. The annular scraper of claim 20, wherein the inlaid thermal barrier coating portion of the annular scraper is positioned between a first edge and a second edge of the annular scraper, the first edge and the second edge including the annular metallic shell portion, the first edge and the second edge each disposed at a radially inner and axially outer position.

23. The annular scraper of claim 20, wherein the inlaid thermal barrier coating portion comprises a material having a lower thermal conductivity than the outer annular metallic shell portion.

24. The annular scraper of claim 20, wherein the inlaid thermal barrier coating portion comprises a ceramic material.

25. The annular scraper of claim 20, wherein an inner diameter of the inlaid thermal barrier coating portion is substantially the same as an inner diameter of the outer annular metallic shell portion.

26. An engine assembly, comprising:
  a cylinder block including a cylinder bore disposed therein, the cylinder bore configured to house a piston; and
  an annular scraper disposed within the cylinder bore, the annular scraper positioned concentrically in the cylinder bore, the annular scraper including an outer annular metallic shell portion and a thermal barrier coating portion, the thermal barrier coating disposed at an inner surface of the outer annular metallic shell portion and concentric with the outer annular metallic shell portion.

27. The engine assembly of claim 26, wherein at least one radially inner and axially outer edge of the annular scraper includes the outer annular metallic shell portion.

28. The engine assembly of claim 26, wherein the outer annular metallic shell portion of the annular scraper comprises steel.

29. The engine assembly of claim 26, wherein the thermal barrier coating portion comprises a material having a lower thermal conductivity than the outer annular metallic shell portion.

30. The engine assembly of claim 26, wherein the thermal barrier coating portion comprises a ceramic material.

* * * * *